United States Patent [19]

Woodson

[11] 3,988,412

[45] Oct. 26, 1976

[54] METHOD OF MAKING PIPE HAVING A LINER LAYER OF MIXED RESINS

[75] Inventor: Charles S. Woodson, Parkersburg, W. Va.

[73] Assignee: Youngstown Sheet and Tube Company, Youngstown, Ohio

[22] Filed: May 13, 1975

[21] Appl. No.: 577,026

Related U.S. Application Data

[60] Continuation of Ser. No. 350,513, April 12, 1973, abandoned, which is a continuation of Ser. No. 155,319, June 21, 1971, abandoned, which is a division of Ser. No. 815,196, April 10, 1969, abandoned.

[52] U.S. Cl............................... 264/255; 264/257; 264/270; 264/271; 264/279; 264/310; 264/331

[51] Int. Cl.$^2$...................... B29C 5/04; B29D 3/02; B29D 23/00

[58] Field of Search ........... 264/257, 310, 311, 255, 264/267, 270, 259, 271, 279, 331

[56] References Cited

UNITED STATES PATENTS

| | | | |
|---|---|---|---|
| 2,567,719 | 9/1951 | Loritsch et al. | 260/31.8 M |
| 2,887,728 | 5/1959 | Usab | 138/141 UX |
| 2,994,919 | 8/1961 | Schafer et al. | 264/311 |
| 3,256,362 | 6/1966 | Craubner et al. | 260/862 |
| 3,338,271 | 8/1967 | Plummer et al. | 138/174 |
| 3,363,028 | 1/1968 | Szalay | 260/862 |
| 3,397,169 | 8/1968 | Wilkinson | 260/862 |

OTHER PUBLICATIONS

Conant et al., Chemistry of Organic Compounds, MacMillan, N.Y. (1939), pp. 275–278 relied on.

Primary Examiner—Willard E. Hoag
Attorney, Agent, or Firm—Vinson Elkins, Searls, Connally & Smith

[57] ABSTRACT

Method of making a plastic pipe and method of making same, having an outer shell of reinforced thermo-setting resin and an inner shell of thermo-setting and thermo-plastic resins.

2 Claims, No Drawings

METHOD OF MAKING PIPE HAVING A LINER LAYER OF MIXED RESINS

This Application is a continuation of application Ser. No. 350,513, filed Apr. 12, 1973, which was a continuation of application Ser. No. 155,319, filed June 21, 1971, which was a division of application Ser. No. 815,196, filed Apr. 10, 1969, all now abandoned.

This invention relates to reinforced plastic pipe, and more particularly to a plastic pipe with a high resistance to cracking.

It is conventional to centrifugally cast a thermo-setting resin pipe reinforced with fibers such as fiberglas. In the casting process, a fiberglas mat and the resin are spun in a mold at high speed. Centrifugal force positions the fiberglas in the outer shell of the pipe. The inner shell is substantially pure resin.

During the curing process the resin-rich inner shell shrinks and stresses are set up in the inner shell. When the pipe is subjected to mechanical or thermal shock, cracks may occur in the inner shell due to the locked in stresses. The outer shell does not usually crack due to the reinforcing material providing a substantial volume of the outer shell.

It has been proposed in U.S. Pat. No. 2,887,728 to centrifugally cast pipe using thermo-setting and thermo-plastic resins of different specific gravity so that in casting the thermo-plastic material is predominantly accumulated on the inner wall of the pipe. As the fiberglas is in the outer section of the pipe wall, there results a layer of thermo-setting resin between the fiberglas and thermo-plastic liner. This intermediate layer is stressed during curing of the pipe and may crack when subjected to mechanical or thermal shock. As the thermo-plastic resin is relatively low in strength, cracks in the intermediate layer will result in cracks in the thermo-plastic liner.

This invention provides a pipe in which the thermo-plastic material is dispersed throughout the entire inner shell of the pipe from the reinforcing fiber boundary to the inner wall of the pipe. Thus, there is no area of pure thermo-setting resin and the locked-in stresses due to shrinkage during curing are substantially eliminated.

An object of this invention is to substantially eliminate locked-in stresses in the inner shell of a reinforced thermo-setting resin pipe.

Another object is to provide a reinforced thermo-setting resin pipe which is much less susceptible to cracking than previously known thermo-setting resin pipe.

In practicing the method of this invention, any conventional centrifugal casting pipe mold may be used. A cylinder of reinforcing material, such as a mat of fiberglas, is placed in the mold. The mold is charged with just enough thermo-setting resin to cover the reinforcing material. Preferably while the innermost fibers are coated with resin, they are exposed from the matrix of resin to insure the absence of a layer of pure thermo-setting resin.

"Cover" as used herein is meant to include a matrix in which the reinforcing material lies just below the inner diameter surface of the matrix, or in which the innermost fibers of reinforcing material are exposed or lie on the surface of the matrix. Of course, an excessive amount of reinforcing material could be exposed, but this would result in an increased wall thickness for a comparable pipe, and thus is not desired.

The mold is spun and preferably heat is applied to form the outer shell of the pipe.

In preparing the material for the inner shell of the pipe, the thermo-plastic powder is thoroughly mixed in the liquid thermo-setting material. For best results, a powder finer than 35 mesh (approximately 500 microns) is utilized. Larger material could be used, but as the particle size increases the inner surface of the pipe will be roughened. A smooth surface is desired, and therefore the finer powder should be utilized.

The percentage by volume of thermo-plastic resin should be at least 15 percent of the mixture to obtain the desired relief of stresses to the extent that a significant reduction in susceptibility to cracking will result. The upper limit is theoretically about fifty to sixty per cent. Preferably, 25 percent by volume thermo-plastic resin is used, as this results in a pipe in which the inner shell is substantially free of locked-in stresses which are significant enough to cause cracking when the pipe is subjected to normally expected mechanical or thermal shock. Greater percentages of thermo-plastic resin could be used, but the dispersion becomes pasty and difficult to spread in the pipe when greater than about 35 percent thermo-plastic resin is used.

The dispersion of thermo-plastic and thermo-setting resins is charged into the previously formed outer shell of the pipe. The pipe is rotated slowly to spread the dispersion evenly throughout the outer pipe shell without separating the dispersion. The pipe may be rotated in the mold or it may be removed from the mold and rotated by other means. If the two resins have the same specific gravity, the rotational speed of the pipe is not significant as the dispersion will not tend to separate. By rotating the pipe slowly, thermo-plastics of any desired density may be utilized.

The pipe is rotated until the inner shell is formed. The thus formed pipe may be further processed to provide end fittings, etc., if desired.

Other than being formed with two charges of resin with slow rotation for the second charge, the pipe is formed using conventional procedures.

The thermo-setting resins used may be any of those well known to plastic chemists. A vinyl ester, such as "Derakane," a product of Dow Chemical Company, is preferred. Other resins may be used, such as "Epocryl," a product of Shell Chemical Company. A polyester such as "Atlac 382," a product of Atlas Chemical Company, or an isophthalic polyester resin, as manufactured by Cook Paint & Varnish Company, may be used.

The pipe may be reinforced with any desired material such as fiberglas, which is preferred.

The powdered thermo-plastic resin used may be any of those well known to plastic chemists. A powdered polyethylene, such as "Microthene USI 708," a product of USI Chemical Co., is preferred. Other resins may be used, such as polypropylene, teflon, polyvinyl chloride, or nylon.

The thermo-setting resin may be cured with any desired catalyst, such as "USP 245", a product of U.S. Peroxygen Corporation.

EXAMPLE

As an example of pipe formed in accordance with this invention, the outer shell may be formed of fiberglas reinforcing mat in a matrix of "Derakane" thermo-setting resin. The inner shell may be formed of 25 percent by volume thermo-plastic material of "USI708" dispersed in "Derakane." The thermo-setting resin may be cured with "USP 245." A pipe of this composition formed in the manner herein defined has been found free of cracks in its inner shell when subjected to mechanical and thermal shocks normally expected in commercial use of pipe of this character.

The foregoing disclosure and description of the invention are illustrative and explanatory thereof and various changes in the size, shape and materials and method of construction may be made within the scope of the appended claims without departing from the spirit of the invention.

What is claimed:

1. A method of producing reinforced plastic pipe consisting essentially of positioning a reinforcing cylinder of fibrous material in a cylindrical mold, introducing thermo-setting resin into the mold and spinning the mold to form the outer shell of a pipe, said thermo-setting resin being of a quantity to just cover said fibrous material, then introducing into the said outer shell of a pipe a dispersion of thoroughly mixed thermo-setting and thermo-plastic resins and rotating the pipe to evenly spread the dispersion over the previously formed shell while maintaining the thermo-plastic resin dispersed throughout the thermo-setting resin to form the inner shell of the pipe.

2. The method of claim 1, wherein the fibrous material is fiberglas, the thermo-setting resin is a vinyl ester, the thermo-plastic resin is powdered polyethylene at least as small as 35 mesh, and the thermo-plastic resin provides at least 15 percent by weight of said dispersion.

* * * * *